United States Patent

Dmitriev et al.

[11] 4,079,260
[45] Mar. 14, 1978

[54] OZONE GENERATOR

[76] Inventors: Andrei Vladimirovich Dmitriev, ulitsa professora Popova, 5, kv. 24, Leningrad; Stanislav Stepanovich Baranov, ulitsa Gagarina, 15, kv. 13, Dzerzhinsk Gorkovskoi oblasti; Georgy Nikolaevich Goncharov, ulitsa Kljukvina, 11a, kv. 33, Dzerzhinsk Gorkovskoi oblasti; Valery Fedorovich Zolotov, ulitsa Oktyabrskaya, 58, kv. 49, Dzerzhinsk Gorkovskoi oblasti; Alexandr Alexeevich Orlov, ulitsa Uritskogo, 10a, kv. 28, Dzerzhinsk Gorkovskoi oblasti; Gennady Nikolaevich Presnetsov, ploschad Ostrovskogo, 9, kv. 25, Leningrad; Valery Ivlivich Semenov, ulitsa Gaidara, 73, kv. 21, Dzerzhinsk Gorkovskoi oblasti, all of U.S.S.R.

[21] Appl. No.: 707,090

[22] Filed: Jul. 20, 1976

[51] Int. Cl.² ............................................. C01B 13/11
[52] U.S. Cl. ................................................ 250/540
[58] Field of Search ................................. 250/532–541

[56] References Cited

U.S. PATENT DOCUMENTS

| 2,010,081 | 8/1935 | Hartman | 250/540 |
| 2,643,224 | 6/1953 | Niccoli | 250/540 |
| 3,899,685 | 8/1975 | Francis et al. | 250/536 |
| 3,996,122 | 12/1976 | Lowther | 204/176 |

FOREIGN PATENT DOCUMENTS

| 2,436,914 | 2/1975 | Germany | 250/541 |

Primary Examiner—Aaron Weisstuch
Attorney, Agent, or Firm—Haseltine, Lake & Waters

[57] ABSTRACT

An ozone generator having a housing accommodating parallel mounted ozonizing elements, each consisting of water-cooled inner and outer electrodes mounted coaxially with a constant gap through which passes the gas to be treated and in which an electric discharge is initiated. Located between the ozonizing elements along their axes are cooling chambers communicating with the gaps of the adjacent ozonizing elements. The inlet and outlet devices for passing the gas to be treated are so arranged in the housing that the gas passes through the ozonizing elements in a direction across their axes.

3 Claims, 3 Drawing Figures

OZONE GENERATOR

The present invention relates to electronic and ionic devices and, more particularly, to ozone generators.

Known in the prior art is an ozone generator including a housing accommodating outer water-cooled, grounded tubular metal electrodes and inner electrodes inserted coaxially therein with a constant gap. Said inner electrodes are tubes made of a dielectric material, such as glass, the inner surfaces of said tubes having a metal coating connected to a high-voltage source through special terminal devices. The housing also has a device for delivery and removal of the gas to be treated and inlet and outlet pipe unions supplying water to cool the outer electrodes. An oxygen-containing gas such as air is fed in an axial direction through the annular space between the outer electrodes and the dielectric tubes. The high voltage in the annular space gives rise to a silent discharge, under the effect of which part of the oxygen is converted into ozone (cf. Federal Republic of Germany Patent No. 1,271,087; cl.12, group 13/12, 1966).

A disadvantage of the known ozone generator is its limited electric power input whose maximum value is determined by the temperature of the gas in the annular space, said temperature depending on the heat transfer between the gas and the cooling liquid.

When the maximum discharge power is increased, the temperature of the gas in the annular space rises sharply up and this reduces the ozone yield and increases the energy consumption in the process of ozone generation.

An object of the present invention is to provide a device for efficient cooling of the gas in order to increase the ozone yield over the same area of the surface of the electrodes of the generator and to decrease the energy consumption needed for production of a unit quantity of ozone.

This and other objects are attained by providing an ozone generator including a housing which accommodates ozonizing elements mounted in parallel; each element comprising inner and outer liquid-cooled tubular electrodes arranged coaxially and separated by a dielectric barrier, said electrodes being mounted with a constant gap, through which passes the gas to be treated and in which an electric discharge is initiated; means for admission and outlet of the gas; and a means for applying a high-voltage current to the electrodes. According to the invention, located between the adjacent ozonizing elements along the axes thereof are gas cooling chambers connected to the gaps of said ozonizing elements through gas passages, said means for inlet and outlet of the gas being mounted so that the gas moves in the ozonizing elements in a direction across their axes.

It is expedient that the gas cooling chambers be provided with partitions mounted in parallel to the axes of the ozonizing elements to improve the heat transfer from the gas to the chamber walls.

It is also expedient that the partitions in the gas cooling chambers be staggered for further improvement of the heat transfer between the gas and the chamber walls.

The present invention is embodied in an ozone generator, which makes it possible to considerably improve the cooling of the gas flow being treated compared to the known ozone generators, which allows the input electric power and, therefore, the output capacity of the generator to be increased, ozone losses due to thermal decomposition to be reduced and the energy consumption for the ozone generation to be decreased on the average by 20-30%.

The invention is further described by way of example with reference to the accompanying drawings, in which.

Figure 1:
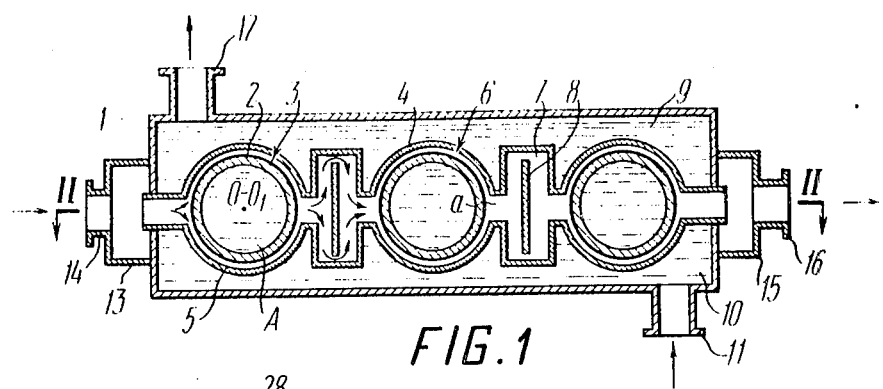
FIG. 1 is a longitudinal sectional view of an ozone generator according to the invention.
Figure 2:
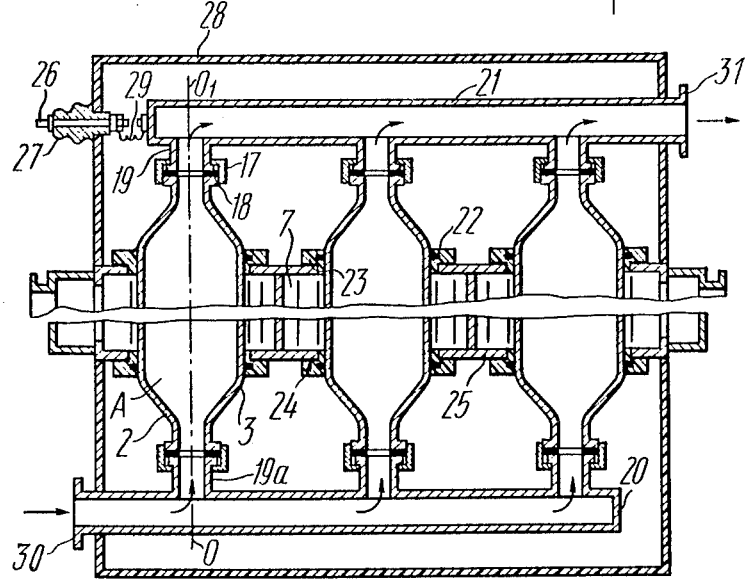
FIG. 2 is a section along line II—II in FIG. 1.
Figure 3:
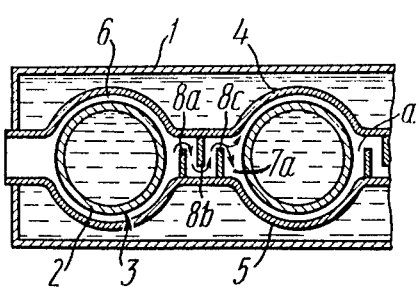
FIG. 3 is a partial view of the ozone generator with staggered partitions in the gas cooling chambers.

The ozone generator shown in FIGS. 1 to 3 has a metal housing 1 accommodating a set of parallel-mounted internal electrodes 2 in the form of metal cylindrical tubes with a dielectric coating 3, e.g. glass enamel, on their outer surface. The outer electrodes are formed by two hermetically sealed metal plates in the housing 1: an upper plate 4 and a lower plate 5 enveloping the inner electrodes 2 with constant gaps (electric discharge zones) 6 thus forming parallel arranged ozonizing elements with axes $0-0_1$.

Between the ozonizing elements, outside the electric discharge zones 6, the plates 4 and 5 form cooling chambers 7, which are provided with partitions 8 for improving the heat transfer from the gas to the walls of the plates 4 and 5.

The walls of the housing 1 of the ozone generator and the walls of the plates 4 and 5 form chambers 9 and 10 communicating hydraulically through tubes (not shown) extending through the plates 4 and 5. Circulating in the chambers 9 and 10 a cooling liquid, e.g. water, admitted through a connecting pipe 11 and discharged through a connecting pipe 12.

The feed gas is supplied to the electric discharge zones 6 through a collector chamber 13 with an inlet pipe union 14 while the ozonized gas is removed through a collector chamber 15 with a pipe union 16.

The inner electrodes 2 through union nuts 17 and sealing gaskets 18 are connected to the pipe unions 19 and 19a of the manifolds 20 and 21 respectively for delivery of the cooling liquid into the inner spaces "A" of the electrodes 2 and for removal of this liquid therefrom. The inner electrodes 2 are hermetically sealed by means of elastic sealing rings 22 in centering flanges 23 made of a dielectric material and secured on the side walls of the housing 1 through sealing gaskets 24. The inner electrodes 2 are fed with a high voltage from a high-voltage transformer (not shown) through a current-conducting pin 26 secured on an insulator bushing 27 mounted on a protective casing 28 made of a dielectric material, e.g. vinyl plastic, and secured on the housing 1.

The current-conducting pin 26 is electrically connected through a flexible conductor 29 to the manifold 21, through which, as well as through the pipe unions 19 and 19a and the nuts 17, high voltage is applied to the inner electrodes 2. The plates 4 and 5 of the outer electrodes are grounded through the housing 1.

FIG. 3 illustrates the staggered arrangement of the partitions 8a, 8b and 8c in the cooling chamber 7a. Such an arrangement improves the heat transfer between the gas and the cooling liquid.

The ozone generator may also include a device for preventing a short circuit, for example, tubular coils of a dielectric material (not shown) mounted before the inlet and outlet pipe unions 30 and 31, when water is used as the cooling liquid. The evolute length of the tubular coil is selected such that the electrical resistance of the water therein is sufficient for preventing a short circuit.

The directions of motion of the gas and cooling liquid. in the ozone generator are shown by arrows in FIGS. 1 and 2. As shown in FIG. 1, the motion of the gas in the ozonizing elements 2, 4, 5 is directed across their axes $O-O_1$.

The proposed ozone generator operates as follows.

A flow of an oxygen-containing gas, e.g. air, to be treated in the generator is continuously forced through the inlet pipe union 14 into the collector chamber 13, from which it enters the electric discharge zones 6.

While passing through the electric discharge zone 6 and flowing around the inner electrode 2, the gas is subjected to the action of a silent discharge. The silent discharge appears in the gaps 6 under the effect of a high voltage applied between the inner electrode 2 with a dielectric coating 3 and the grounded plates 4 and 5 forming the outer electrode. Under the action of the electric discharge, oxygen is partially converted into ozone. In this case, the gas is heated and, in order to prevent thermal decomposition of the ozone, it is subjected to forced cooling by the cooling liquid circulating in the chambers 9, 10 and in the space "A" of the inner electrodes 2.

The gas coming out from the discharge zone 6 through the passages "a" enters the chamber 7 or 7a, where it is cooled once again to provide thermal stabilization of the generated ozone. Then, the gas passes through the passage "a" and enters the discharge zone of the next ozonizing element and again passes through the cooling chamber 7 or 7a. When the gas repeatedly passes through the discharge zones 6 and the cooling chambers 7 or 7a, its temperature is maintained at an optimum level so that the ozone yield is much increased, while the thermal decomposition of ozone is minimized. The ozonized gas comes out from the generator through the collector chamber 15 and the pipe union 16.

What is claimed is:

1. An ozone generator including a housing comprising: parallel-mounted ozonizing elements, each having coaxially arranged liquid-cooled inner and outer tubular electrodes separated by a dielectric barrier and mounted with a constant gap through which the gas to be treated passes and in which an electric discharge is initiated; gas cooling chambers located between the adjacent ozonizing elements along their axes and communicating with the gaps of said ozonizing elements through gas passages; gas inlet and outlet means mounted so that the motion of the gas in said ozonizing elements is directed across their axes; means for applying a high-voltage current to said electrodes; means for delivery and removal of the cooling liquid for cooling said outer electrodes; means for delivery and removal of a cooling liquid for cooling said inner electrodes.

2. An ozone generated as claimed in claim 1, wherein said gas cooling chambers have partitions mounted in parallel to the axes of said ozonizing elements.

3. An ozone generator as claimed in claim 2, wherein said partitions are staggered in said cooling chambers.

* * * * *

UNITED STATES PATENT OFFICE
CERTIFICATE OF CORRECTION

Patent No. 4,079,260              Dated March 14, 1978

Inventor(s) Andrei Vladimirovich Dmitriev et al.

It is certified that error appears in the above-identified patent and that said Letters Patent are hereby corrected as shown below:

On the cover sheet Item (21) should read:
-- Appl. No. 707,099 --.

Signed and Sealed this

Eighth Day of August 1978

[SEAL]

Attest:

RUTH C. MASON  
Attesting Officer

DONALD W. BANNER  
Commissioner of Patents and Trademarks